United States Patent
Blake et al.

(10) Patent No.: US 11,386,384 B2
(45) Date of Patent: Jul. 12, 2022

(54) DELIVERY-LOCATION RECHARGING DURING AERIAL TRANSPORT TASKS

(71) Applicant: X Development LLC, Mountain View, CA (US)

(72) Inventors: Jesse Blake, Sunnyvale, CA (US); André Prager, Sunnyvale, CA (US); Eric Teller, Palo Alto, CA (US)

(73) Assignee: Wing Aviation LLC, Mountain View, CA (US)

( * ) Notice: Subject to any disclaimer, the term of this patent is extended or adjusted under 35 U.S.C. 154(b) by 485 days.

(21) Appl. No.: 15/852,804

(22) Filed: Dec. 22, 2017

(65) Prior Publication Data
US 2019/0197463 A1    Jun. 27, 2019

(51) Int. Cl.
*G06Q 10/08*    (2012.01)

(52) U.S. Cl.
CPC .................................. *G06Q 10/083* (2013.01)

(58) Field of Classification Search
CPC ............... G06Q 30/02; G06Q 30/0226; G06Q 30/0229; G06Q 30/0233; G06Q 30/0232; G06Q 30/0227; G06Q 30/0236; G06Q 30/0238; G06Q 30/0283; G06Q 40/12; G06Q 30/0208; G06Q 30/0235; G06Q 30/0601; G06Q 30/0269; G06Q 20/042; G06Q 20/208; G06Q 30/0209; G06Q 30/0211; G06Q 30/0217; G06Q 30/0219; G06Q 30/0224; G06Q 30/0225; G06Q 30/0228; G06Q 30/0267; G06Q 30/0613; G06Q 20/10; G06Q 20/102; G06Q 40/02; G06Q 20/40; G06Q 30/0207; G06Q 20/20; G06Q 30/0215; G06Q 40/025; G06Q 20/4014; G06Q 50/06; G06Q 20/3437; G06Q 20/389; G06Q 20/32;
(Continued)

(56) References Cited

U.S. PATENT DOCUMENTS 9,174,733 B1    11/2015  Burgess et al.
9,412,279 B2     8/2016  Kantor et al.
(Continued)

OTHER PUBLICATIONS

Marcia Heroux Pounds; "Robot grocery and package delivery could be coming to you"; Jul. 9, 2017; Sun Sentinel (Year: 2017).*
(Continued)

*Primary Examiner* — Michael P Harrington
*Assistant Examiner* — Jorge G Del Toro-Ortega
(74) *Attorney, Agent, or Firm* — McDonnell Boehnen Hulbert & Berghoff LLP

(57) ABSTRACT

Methods and systems for recipient-assisted recharging during delivery by an unmanned aerial vehicle (UAV) are disclosed herein. During a UAV transport task, a UAV determines that the UAV has arrived at a delivery location specified by a first flight leg of the transport task. The UAV responsively initiates a notification process indicating that a recipient-assisted recharging process should be initiated at or near the delivery location. When the UAV determines that the recipient-assisted recharging process has recharged a battery of the UAV to a target level, and also determines that a non-returnable portion of the payload has been removed from the UAV while a returnable portion of the payload is coupled to or held by the UAV, the UAV initiates a second flight segment of the transport task.

20 Claims, 9 Drawing Sheets

(58) Field of Classification Search
CPC .......... G06Q 30/0222; G06Q 30/0231; G06Q 30/0234; G06Q 30/0239; G06Q 30/0261; G06Q 40/00; G06Q 10/02; G06Q 20/322; G06Q 30/0241; G06Q 30/0259; G06Q 30/06; G06Q 10/04; G06Q 10/06; G06Q 10/083; G06Q 20/12; G06Q 20/3821; G06Q 20/3829; G06Q 20/387; G06Q 2220/00; G06Q 30/0202; G06Q 30/0206; G06Q 50/10; G06Q 10/047; G06Q 10/063112; G06Q 10/0833; G06Q 10/1093; G06Q 10/1095; G06Q 10/20; G06Q 20/0855; G06Q 20/105; G06Q 20/18; G06Q 20/3223; G06Q 20/327; G06Q 20/40145; G06Q 20/4037; G06Q 20/405; G06Q 2240/00; G06Q 30/01; G06Q 30/018; G06Q 30/0185; G06Q 30/0201; G06Q 30/0216; G06Q 30/0251; G06Q 30/0253; G06Q 30/0265; G06Q 30/0268; G06Q 30/0281; G06Q 30/04; G06Q 30/0603; G06Q 30/0635; G06Q 30/0637; G06Q 30/0641; G06Q 30/08; G06Q 50/26; G06Q 50/30

See application file for complete search history.

(56) References Cited

U.S. PATENT DOCUMENTS

| | | | |
|---|---|---|---|
| 9,545,852 B2 | 1/2017 | Streett | |
| 9,650,136 B1 | 5/2017 | Haskin et al. | |
| 10,040,552 B2* | 8/2018 | Gordon | G06Q 10/0832 |
| 10,303,171 B1* | 5/2019 | Brady | G08G 1/207 |
| 10,538,190 B1* | 1/2020 | Metellus | A47B 96/00 |
| 2012/0167917 A1* | 7/2012 | Gilbert, Jr. | A47L 11/408 134/6 |
| 2014/0251743 A1 | 9/2014 | Childress et al. | |
| 2015/0006005 A1* | 1/2015 | Yu | G06Q 50/28 701/22 |
| 2015/0336669 A1 | 11/2015 | Kantor et al. | |
| 2016/0016664 A1* | 1/2016 | Basuni | B60L 50/90 244/17.13 |
| 2016/0042637 A1* | 2/2016 | Cahill | H04W 4/029 701/3 |
| 2016/0068264 A1* | 3/2016 | Ganesh | B64C 39/024 701/2 |
| 2016/0196756 A1* | 7/2016 | Prakash | G08G 5/025 701/3 |
| 2016/0209839 A1 | 7/2016 | Hoareau et al. | |
| 2016/0257423 A1 | 9/2016 | Martin | |
| 2016/0340006 A1* | 11/2016 | Tang | G06Q 50/28 701/22 |
| 2017/0090484 A1 | 3/2017 | Obaidi | |
| 2017/0203843 A1* | 7/2017 | Chan | B64C 39/024 |
| 2017/0267347 A1 | 9/2017 | Rinaldi et al. | |
| 2017/0286892 A1* | 10/2017 | Studnicka | G06Q 20/204 |
| 2017/0344000 A1* | 11/2017 | Krishnamoorthy | G08G 5/0013 |
| 2019/0122177 A1* | 4/2019 | Briggs | B64C 39/024 |
| 2019/0171218 A1* | 6/2019 | Hammond | G05D 1/024 |
| 2020/0317084 A1* | 10/2020 | Schaffer | H02J 7/0047 |

OTHER PUBLICATIONS

International Searching Authority, International Search Report and Written Opinion dated Apr. 15, 2019, issued in connection with International Patent Application No. PCT/US2018/065954, filed Dec. 17, 2018, 11 pages.

Wingfield, Nick, "Amazon Will Let Customers Try on Clothes Before Buying," The New York Times, Jun. 20, 2017, 6 pages.

International Bureau, International Preliminary Report on Patentability dated Jul. 2, 2020, issued in connection with International Patent Application No. PCT/US2018/065954 filed on Dec. 17, 2018, 8 pages.

Intellectual Property Office of Singapore, Written Opinion dated Feb. 5, 2021, issued in connection with Singapore Patent Application No. 11202005764U, filed on Dec. 17, 2018, 9 pages.

Australian Patent Office, Examination Report No. 1 dated Mar. 5, 2021, issued in connection with Australian Patent Application No. 2018392910,4 pages.

Alexander et al., "Project Appa Team SkyBison—Team 2 Final Report", Mechanical Engineering 102B, Mechatronics Design, May 10, 2016, pp. 1-46.

Chu, Jennifer, "Delivery by drone—New algorithm lets drones monitor their own health during long package-delivery missions," MIT News, Aug. 21, 2014, 5 pages.

Dormehl, Luke, "Batteries? Who needs 'em! Engineers just built a drone that can sip power wirelessly in midair," Digital Trends, Oct. 21, 2016, pp. 1-2.

European Patent Office, Extended European Search Report dated Jun. 21, 2021, issued in connection with European Patent Application No. 18890075.7, 11 pages.

* cited by examiner

DELIVERY-LOCATION RECHARGING DURING AERIAL TRANSPORT TASKS

BACKGROUND

An unmanned system, which may also be referred to as an autonomous vehicle, is a vehicle capable of travel without a physically-present human operator. An unmanned system may operate in a remote-control mode, in an autonomous mode, or in a partially autonomous mode.

When an unmanned system operates in a remote-control mode, a pilot or driver that is at a remote location can control the unmanned vehicle via commands that are sent to the unmanned vehicle via a wireless link. When the unmanned system operates in autonomous mode, the unmanned system typically moves based on pre-programmed navigation waypoints, dynamic automation systems, or a combination of these. Further, some unmanned systems can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned systems exist for various different environments. For instance, unmanned aerial vehicles (UAVs) are configured for operation in the air (e.g., flight). Examples include quad-copters and tail-sitter UAVs, among others. Unmanned systems also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

An unmanned aerial vehicle (UAV) can be used to deliver items to recipients, such as various goods or food items. In certain cases, a UAV delivery task could involve both transporting an item or items to a recipient at a designated delivery location, and also transporting an item or items back from the delivery location. In this scenario, there is often down-time, where a UAV waits on the recipient to provide an item or items for return (waiting for return of re-usable utensils used to consume delivered food items, or waiting for a recipient to try on delivered clothing items). Such downtime may reduce the efficiency of a UAV in providing delivery services, since it reduces the number of deliveries a UAV is capable of completing in a given amount of time. Accordingly, example embodiments may help to more efficiently utilize UAV downtime in item return scenarios by initiating or requesting initiation of a recipient-assisted recharging process at the delivery location, such that the UAV can recharge its battery or batteries during such downtime.

In one aspect, an example method involves: (a) during a transport task being carried out by a UAV, determining that the UAV has arrived at a delivery location, wherein the transport task comprises at least a first flight segment to transport a payload from a loading location to a delivery location, delivery of the payload at the delivery location, and a second flight segment from the delivery location to a next location; (b) in response to determining that the UAV has arrived at the delivery location, initiating a notification process indicating that a recipient-assisted recharging process should be initiated at or near the delivery location; (d) determining that the recipient-assisted recharging process has recharged a battery of the UAV to a target level, and responsively: (i) determining when a non-returnable portion of the payload has been removed from, and a returnable portion of the payload is coupled to or held by, the UAV; and (ii) when the non-returnable portion is removed and the returnable portion is secured, initiating the second flight segment for the transport task.

In another aspect, an example method involves: (a) during a transport task being carried out by a UAV, determining that the UAV has arrived at a delivery location, wherein the transport task comprises at least a first flight segment from a source location to a delivery location for delivery of a payload, and a second flight segment from the delivery location to a next location; (b) in response to determining that the UAV has landed at the delivery location: (i) providing an interface for receiving, via one or more interface components of the UAV, an indication as to whether or not a return payload will be loaded at the delivery location; and (ii) initiating a notification process to indicate that a recipient-assisted recharging process should be initiated; (c) determining that the recipient-assisted recharging process has recharged a battery of the UAV to a target level; (d) when an indication is received that no return payload will be loaded at the delivery location and the recipient-assisted recharging process has recharged the battery to the target level, initiating the second flight segment; and (d) when an indication is received that a return payload will be loaded at the delivery location and the recipient-assisted recharging process has recharged the battery to the target level, determining when the returned portion of the payload is loaded on or in the UAV and responsively initiating the second flight segment.

In a further aspect, an aerial vehicle comprises: a rechargeable battery, a power interface for electronically coupling to an external AC power source, an AC/DC converter coupled to the power interface and operable to convert alternating current to direct current, a charging circuit operable to use direct current from the AC/DC converter to charge the rechargeable battery, and one or more control systems. The one or more control systems are operable to: (i) cause the UAV to carry out a first flight segment from a loading location to a delivery location, wherein the first flight segment is part of a transport task being carried out by the UAV; (ii) determine that the UAV has arrived at the delivery location; (iii) in response to determining that the UAV has arrived at the delivery location: (a) determine when a non-returnable portion of the payload is removed from, and a returnable portion of the payload is secured to or within, the payload bay; and (b) initiate a notification process to indicate that a recipient-assisted recharging process should be initiated, wherein the recipient-assisted recharging process involves connection of the power interface to an external AC power source at the delivery location; and (iv) in response to (a) a determination that the recipient-assisted recharging process has recharged a battery of the UAV to a target level, and (b) a determination that the non-returnable portion is removed and the returnable portion is secured, initiate a second flight segment of the transport task.

These as well as other aspects, advantages, and alternatives, will become apparent to those of ordinary skill in the art by reading the following detailed description, with reference where appropriate to the accompanying drawings.

DETAILED DESCRIPTION

Figure 1A:
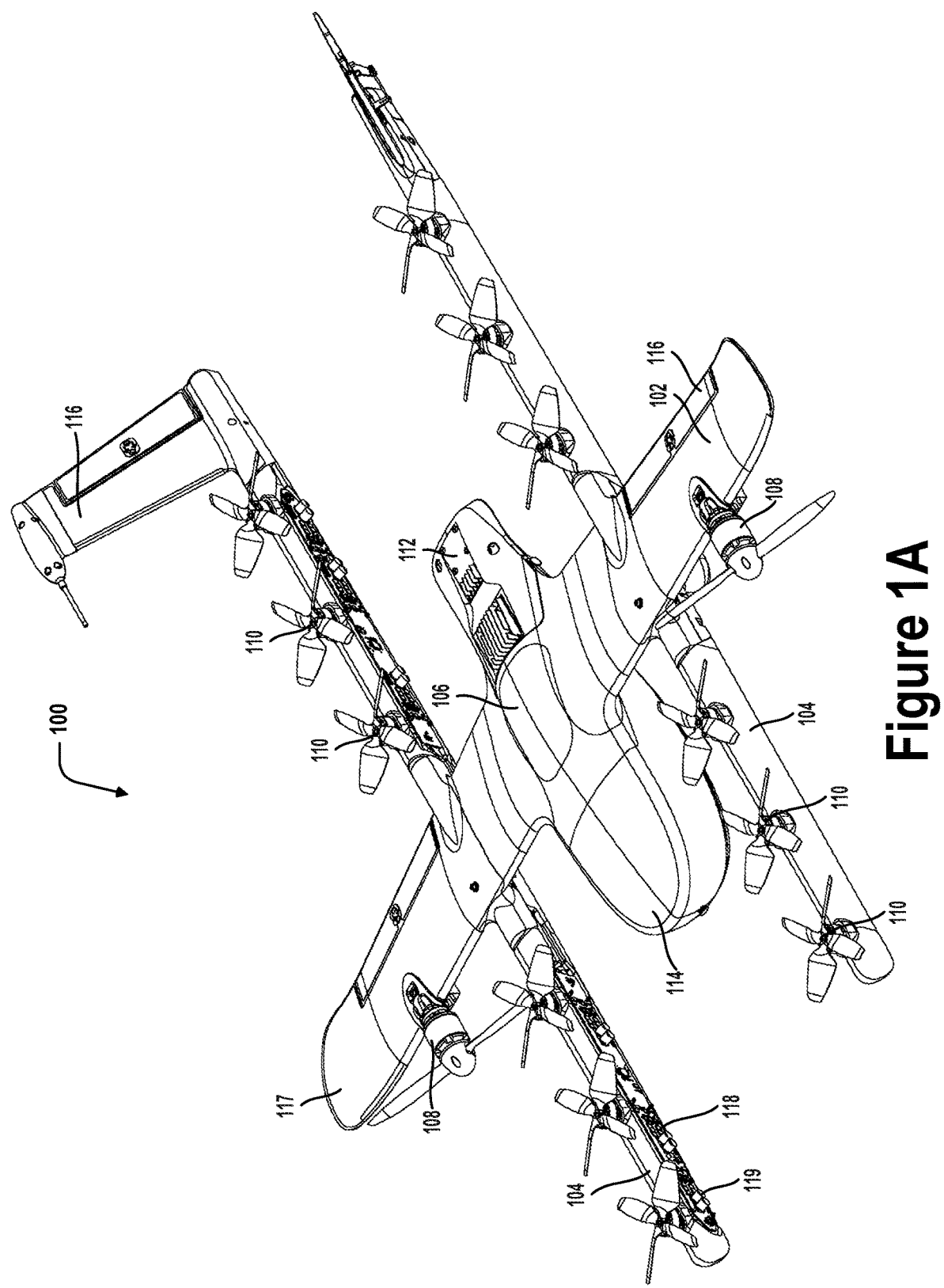
FIG. 1A is a simplified illustration of an unmanned aerial vehicle, according to example embodiments.

Example methods and systems are described herein. It should be understood that the words "example" and "example" are used herein to mean "serving as an example, instance, or illustration." Any embodiment or feature described herein as being an "example" or "example" is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. Overview

In arrangements where an unmanned aerial vehicle (UAV) operator utilizes a UAV to transport an item to a recipient (e.g., UAV delivery from a merchant to a consumer), a transport task to deliver item(s) can involve at least two flight legs—a first flight from the source of the item (e.g., a merchant's warehouse or a restaurant) to a delivery location (e.g., a customer's home or delivery address), and a second flight from the delivery location back to UAV operator's location, where the UAV can be recharged for its next item transport task. In such configurations, the UAV range for a transport task is often considered to be half (or less than half) of the distance the UAV can travel given its battery's state of charge, to allow for flight to and from the delivery location.

In certain cases, a UAV delivery task could involve both transporting an item or items to a recipient at a designated delivery location, and also transporting an item or items back from the delivery location. For instance, when food is delivered by a UAV, the recipient may eat their food, and then place reusable or recyclable utensils, tableware, dishware, or food packaging back in the UAV, so that the UAV can carry it back to be re-used for subsequent deliveries and/or recycled. As another example, a UAV may deliver clothing items to a recipient, and provide a designated try-on period after landing at the delivery location, during which the recipient has the option to place some or all of the delivered clothing items back in the same UAV for return to the seller.

As yet another example, a UAV could provide for a product exchange, where a UAV transports a new product to a delivery location specified by a recipient (e.g., the recipient's home or work address). After delivering the new product, the UAV may allow the recipient a certain period of time to place a previously ordered product (of the same or different type) in a bay in the UAV, or to otherwise secure the previously ordered product to the UAV or UAV payload, in order to return the previously ordered product to a seller.

In the above and other scenarios, there is often downtime, where a UAV waits at the delivery location for the recipient to provide an item or items for return (or more generally, for transport away from the delivery location). Such down-time may reduce the efficiency of a UAV in providing delivery services, since it reduces the number of deliveries a UAV is capable of completing in a given amount of time. Accordingly, example embodiments may help to more efficiently utilize UAV down-time in item return scenarios. More specifically, a UAV may initiate or request initiation of a recipient-assisted recharging process at the delivery location, such that the UAV can recharge its battery or batteries during such downtime.

In a further aspect, when a group of battery-powered unmanned aerial vehicles (UAVs) is utilized for item transport service (e.g., delivery of goods), the amount of transport flights that can be completed over a period of time varies according to the amount of time and frequency with which UAVs need to recharge their batteries. Furthermore, the range or coverage will vary according to battery life, which in large part dictates how far a UAV can fly to deliver an item. Accordingly, methods and systems that improve battery capacity, reduce battery weight, more efficiently use battery power, and recharge batteries more quickly and efficiently, are beneficial.

In a typical delivery scenario using an electric vehicle without recipient-assisted recharging, the delivery range is limited to half the distance the vehicle can travel on a full charge (to allow for travel to and from the delivery location). By utilizing such a recipient-assisted recharging process at delivery locations, example methods can help to extend the delivery range for UAV transport tasks to more than half the distance a UAV can travel on its battery's current state of charge. In particular, by utilizing a recipient-assisted recharging process that allows a UAV to be recharged (partially or wholly) at the delivery location, a UAV does not need to save as much (or possibly any) battery power for a return flight.

II. Illustrative Unmanned Vehicles

Herein, the terms "unmanned aerial system" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial vehicle" (UAV) may also be used to refer to a UAV FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1A illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
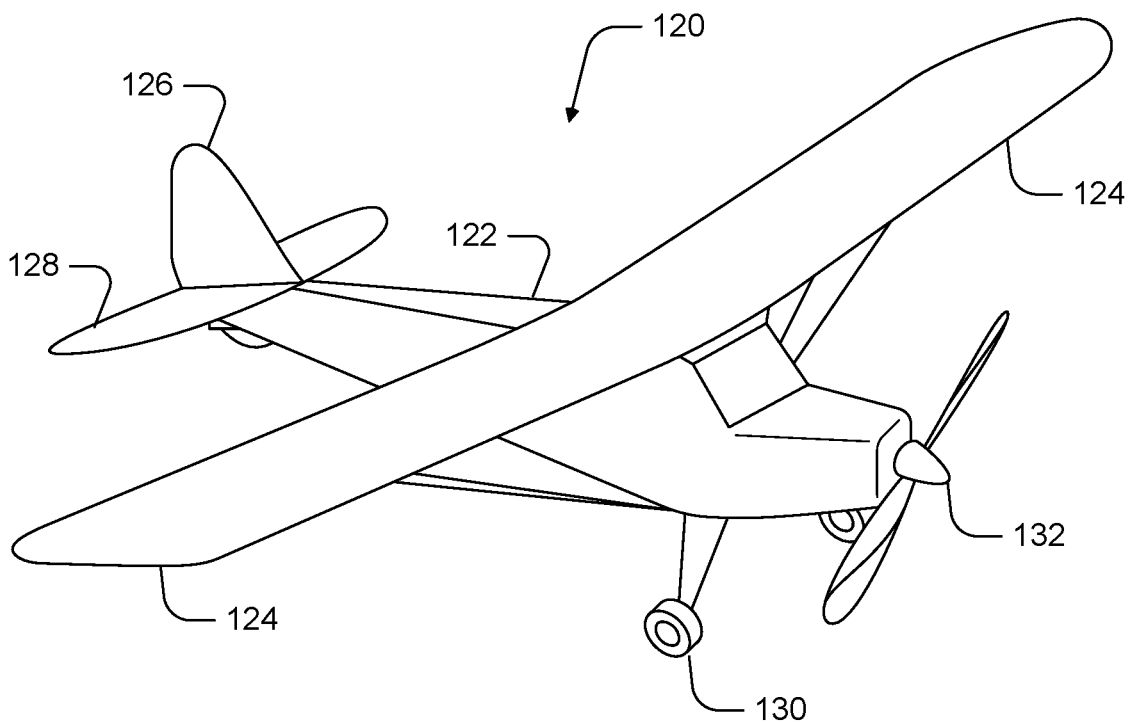
FIG. 1B is a simplified illustration of an unmanned aerial vehicle, according to example embodiments.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
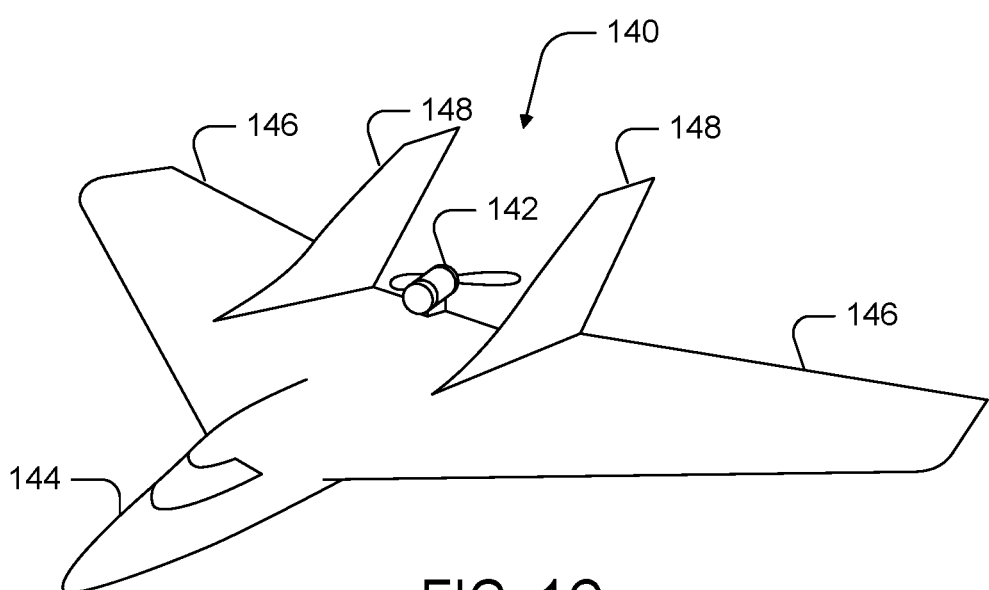
FIG. 1C is a simplified illustration of an unmanned aerial vehicle, according to example embodiments.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
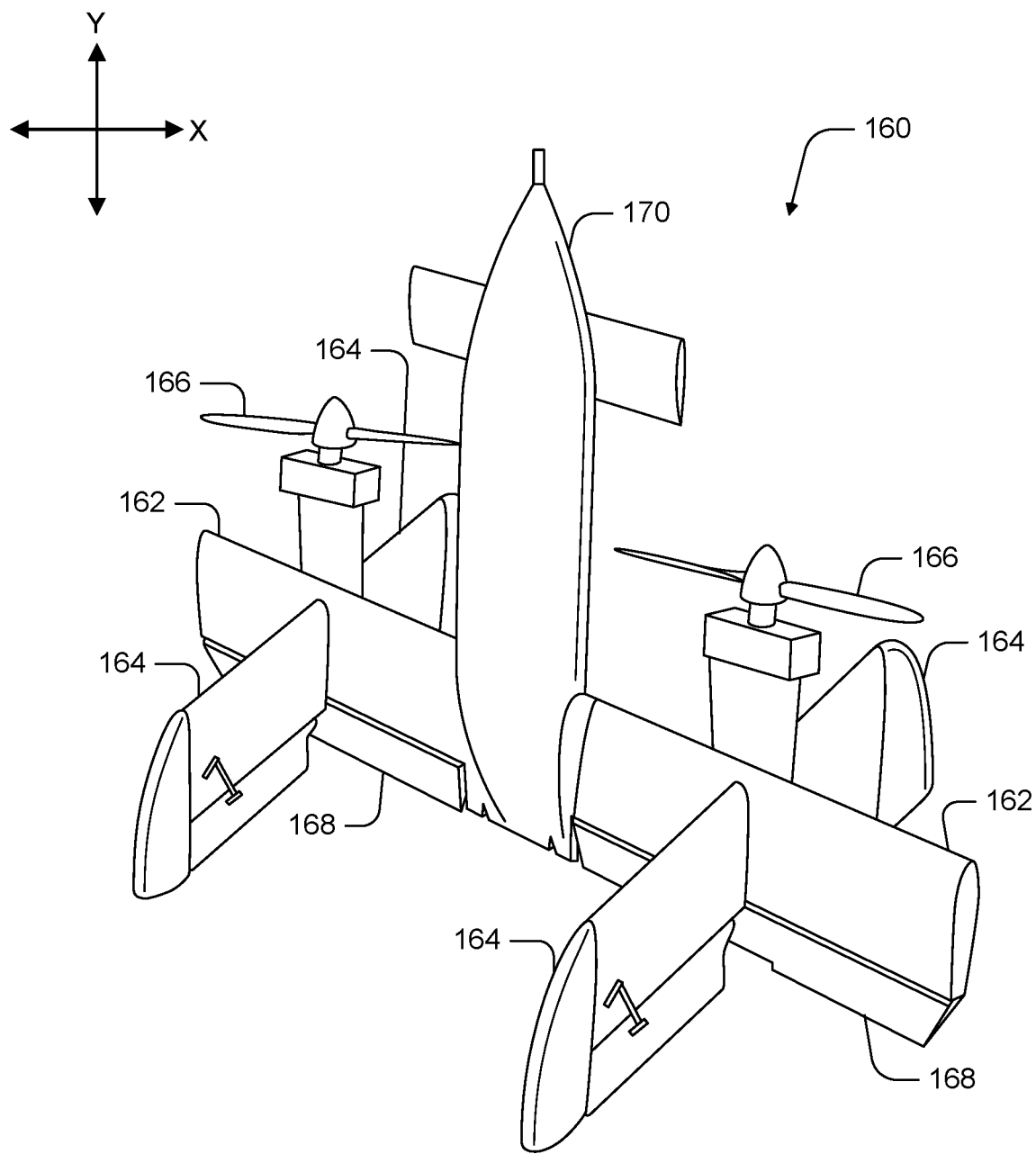
FIG. 1D is a simplified illustration of an unmanned aerial vehicle, according to example embodiments.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
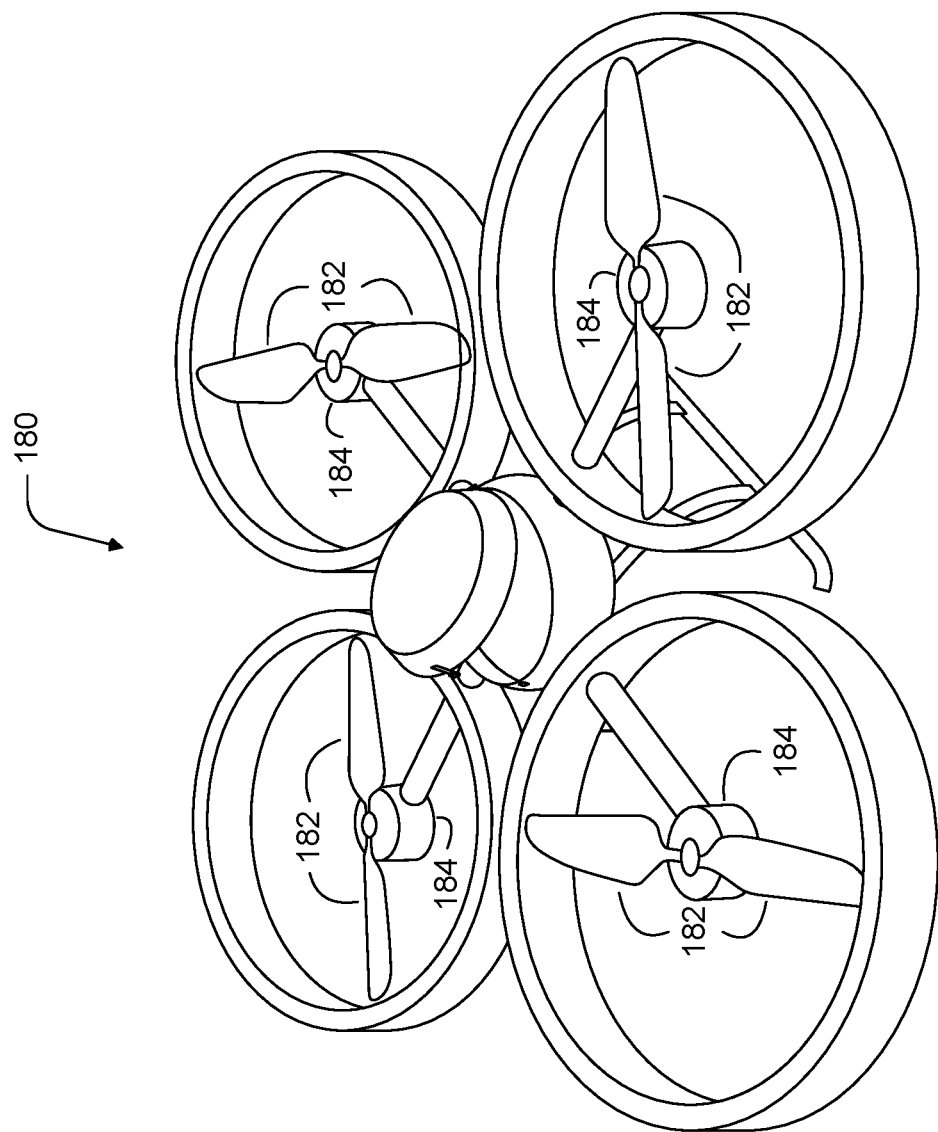
FIG. 1E is a simplified illustration of an unmanned aerial vehicle, according to example embodiments.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. Illustrative UAV Components

Figure 2:
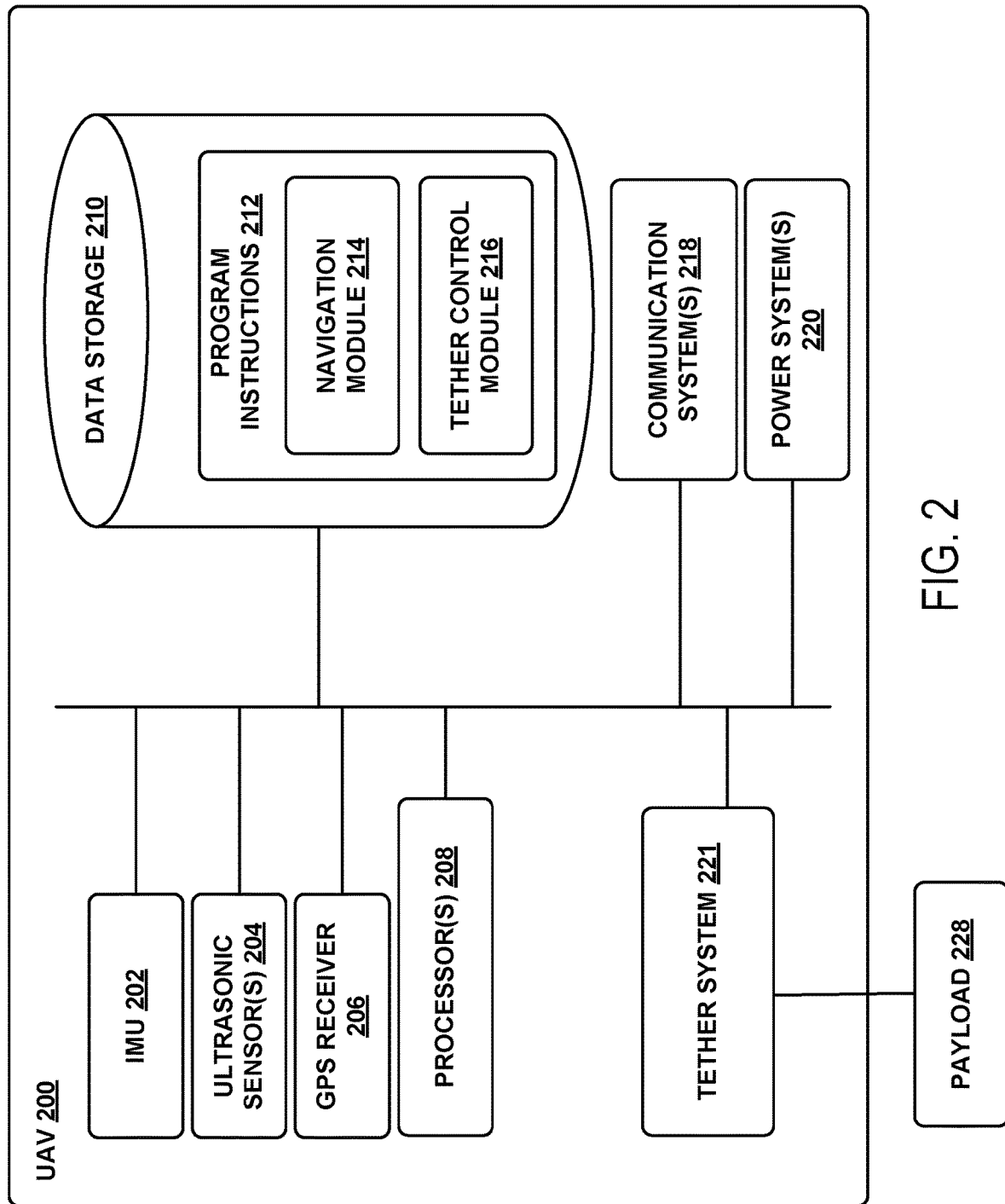
FIG. 2 is a simplified block diagram illustrating components of an unmanned aerial system, according to example embodiments.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location (e.g., a delivery location), the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine altitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

In a further aspect, the power systems 220 of UAV 200 a power interface for electronically coupling to an external AC power source, and an AC/DC converter coupled to the power interface and operable to convert alternating current to direct current that charges the UAV's battery or batteries. For instance, the power interface may include a power jack or other electric coupling for connecting to a 110V, 120V, 220V, or 240V AC power source. Such a power system may facilitate a recipient-assisted recharging process, where a recipient can connect the UAV to a standard power source at a delivery location, such as the recipient's home or office. Additionally or alternatively, power systems 220 could include a inductive charging interface, such that recipient-assisted recharging can be accomplished wirelessly via an inductive charging system installed or otherwise available at the delivery location.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may one or more food items, purchased goods, medical items, or any other object(s) having a size and weight suitable to be transported between two locations by the UAV. In some embodiments, a payload 228 may simply be the one or more items that are being delivered (e.g., without any package housing the items). And, in some embodiments, the items being delivered, the container or package in which the items are transported, and/or other components may all be considered to be part of the payload.

In some embodiments, the payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when the payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a tether system 221, which may be controlled by the tether control module 216 in order to lower the payload 228 to the ground while the UAV hovers above. The tether system 221 may include a tether, which is couplable to a payload 228 (e.g., a package). The tether 224 may be wound on a spool that is coupled to a motor 222 of the UAV (although passive implementations, without a motor, are also possible). The motor may be a DC motor (e.g., a servo motor) that can be actively controlled by a speed controller, although other motor configurations are possible. In some embodiments, the tether control module 216 can control the speed controller to cause the 222 to rotate the spool, thereby unwinding or retracting the tether and lowering or raising the payload coupling apparatus. In practice, a speed controller may output a desired operating rate (e.g., a desired RPM) for the spool, which may correspond to the speed at which the tether system should lower the payload towards the ground. The motor may then rotate the spool so that it maintains the desired operating rate (or within some allowable range of operating rates).

In order to control the motor via a speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

In some embodiments, a payload coupling component (e.g., a hook or another type of coupling component) can be configured to secure the payload 228 while being lowered from the UAV by the tether. The coupling apparatus or component and can be further configured to release the payload 228 upon reaching ground level via electrical or electro-mechanical features of the coupling component. The payload coupling component can then be retracted to the UAV by reeling in the tether using the motor.

In some implementations, the payload 228 may be passively released once it is lowered to the ground. For example, a payload coupling component may provide a passive release mechanism, such as one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

In another implementation, a payload coupling component may include a hook feature that passively releases the payload when the payload contacts the ground. For example, the payload coupling component may take the form of or include a hook feature that is sized and shaped to interact with a corresponding attachment feature (e.g., a handle or hole) on a payload taking the form of a container or tote. The hook may be inserted into the handle or hole of the payload container, such that the weight of the payload keeps the payload container secured to the hook feature during flight. However, the hook feature and payload container may be designed such that when the container contacts the ground and is supported from below, the hook feature slides out of the container's attachment feature, thereby passively releasing the payload container. Other passive release configurations are also possible.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

In some arrangements, a UAV may not include a tether system 221. For example, a UAV could include an internal compartment or bay in which the UAV could hold items during transport. Such a compartment could be configured as a top-loading, side-loading, and/or bottom-loading chamber. The UAV may include electrical and/or mechanical means (e.g., doors) that allow the interior compartment in the UAV to be opened and closed. Accordingly, the UAV may open the compartment in various circumstances, such as: (a) when picking up an item for delivery at an item source location, such that the item can be placed in the UAV for delivery, (b) upon arriving at a delivery location, such that the recipient can place an item for return into the UAV, and/or (c) in other circumstances. Further, it is also contemplated, that other non-tethered mechanisms for securing payload items to a UAV are also possible, such as various fasteners for securing items to the UAV housing, among other possibilities. Yet further, a UAV may include an internal compartment for transporting items and/or other non-tethered mechanisms for securing payload items, in addition or in the alternative to a tether system 221.

IV. Illustrative UAV Deployment Systems

Figure 3:
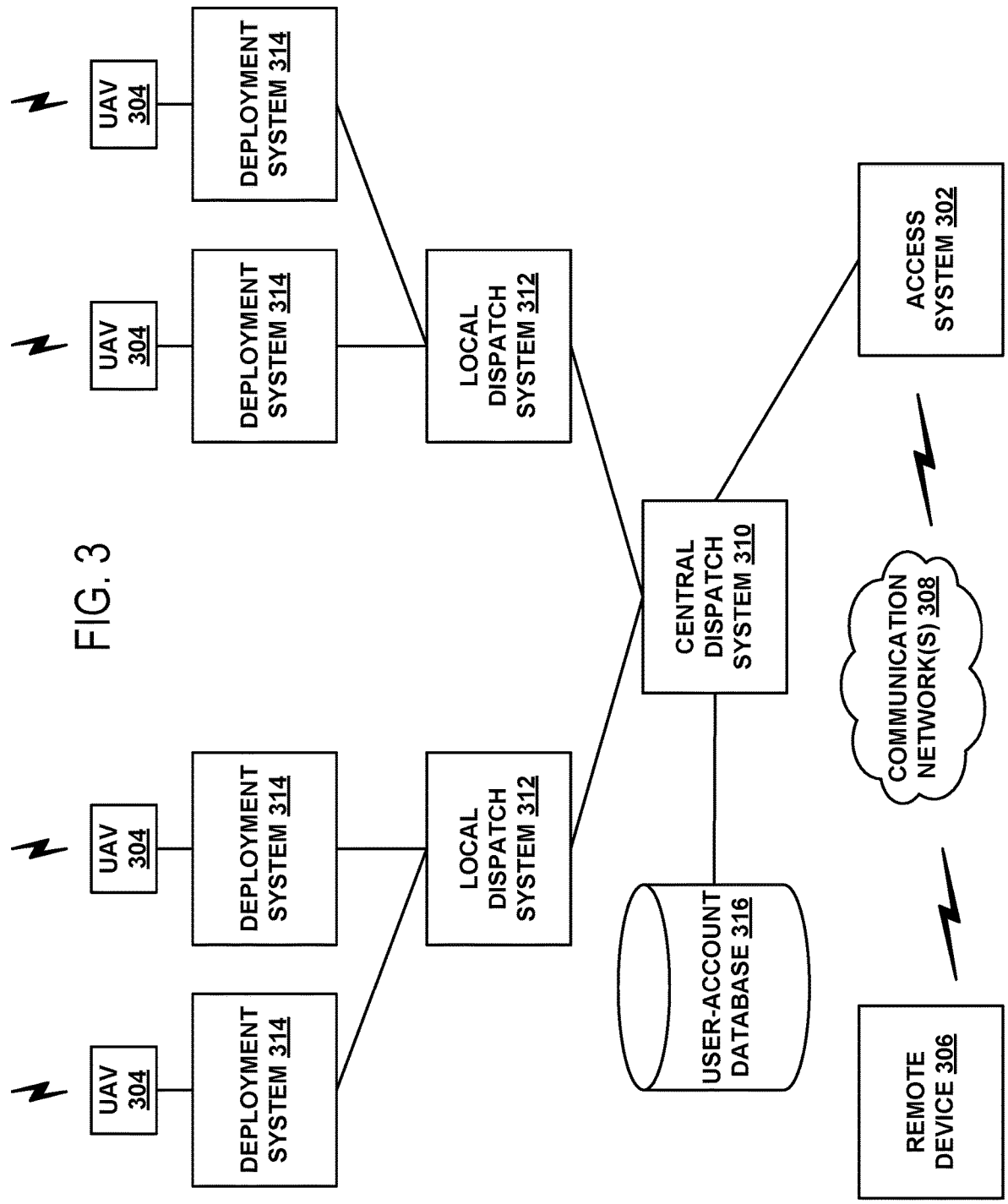
FIG. 3 is a simplified block diagram illustrating a distributed UAV system, according to example embodiments.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIG. 1, 2, 3, or 4. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request pick-up of one or more items from a certain source location and/or delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In some embodiments, a business user (e.g., a restaurant) could utilize one or more remote devices 306 to request that a UAV be dispatched to pick-up one or more items (e.g., a food order) from a source location (e.g., the restaurant's address), and then deliver the one or more items to a target location (e.g., a customer's address). Further, in such embodiments, there may be a number of remote devices 306 associated with a common item-provider account (e.g., an account used by multiple employees and/or owners of a particular restaurant). Additionally, in such embodiments, a remote device 306 may be utilized to send item-provider submissions to a transport-provider computing system (e.g., central dispatch system 310 and or local dispatch system 312), which each indicate a respective quantitative measure for a given amount of UAV transport service at a given future time. For example, remote device 306 may be utilized to generate and send an item-provider submission that specifies a level of desired UAV transport services (e.g., number and/or rate of expected UAV delivery flights), and/or a monetary value corresponding to the item provider's need for UAV transport services, at a particular time or during a particular period of time in the future.

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system (e.g., having more layers of control), and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In some implementations, some or all of the deployment systems 314 may be a structure or system that passively facilitates a UAV taking off from a resting position to begin a flight. For example, some or all of the deployment systems 314 may take the form of a landing pad, a hangar, and/or a runway, among other possibilities. As such, a given deployment system 314 may be arranged to facilitate deployment of one UAV 304 at a time, or deployment of multiple UAVs (e.g., a landing pad large enough to be utilized by multiple UAVs concurrently).

Additionally or alternatively, some or all of deployment systems 314 may take the form of or include systems for actively launching one or more of the UAVs 304. Such launch systems may include features that provide for an automated UAV launch and/or features that allow for a human-assisted UAV launch. Further, a given deployment system 314 may be configured to launch one particular UAV 304, or to launch multiple UAVs 304.

Note that deployment systems 314 may also be configured to passively facilitate and/or actively assist a UAV when landing. For example, the same landing pad could be used for take-off and landing. Additionally or alternatively, a deployment system could include a robotic arm operable to receive an incoming UAV. A deployment system 314 could also include other structures and/or systems to assist and/or facilitate UAV landing processes. Further, structures and/or systems to assist and/or facilitate UAV landing processes may be implemented as separate structures and/or systems, so long as UAVs can move or be moved from a landing structure or system to a deployment system 314 for re-deployment.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, local dispatch systems 312 (along with their respective deployment system(s) 314 may be strategically distributed throughout an area such as a city. For example, local dispatch systems 312 may be strategically distributed such that each local dispatch systems 312 is proximate to one or more payload pickup locations (e.g., near a restaurant, store, or warehouse). However, the local dispatch systems 312 may be distributed in other ways, depending upon the particular implementation.

As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more person. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a user name and password), and/or other information that may be used to authorize access to a user account.

In some embodiments, a person may associate one or more of their devices with their user account, such that they can access the services of UAV system 300. For example, when a person uses an associated mobile phone to, e.g., place a call to an operator of the access system 302 or send a message requesting a UAV-related service to a dispatch system, the phone may be identified via a unique device identification number, and the call or message may then be attributed to the associated user account. Other examples are also possible.

Additionally or alternatively, an item provider that wishes to deliver their products using UAV transport services provided by an ATSP to deliver, can register for an item-provider account with the UAV system 300. As such, the user-account database 316 may include authorization information for a given item-provider account (e.g., one or more user name and password combinations), and/or other information that may be used to authorize access to a given item-provider account. Alternatively, data for item-provider accounts may be kept in a separate database from recipient user accounts. Other data structures and storage configurations for storing such account data are also possible.

IV. UAV Transport Services with Separately Located Item Providers and UAV Hubs

As noted above, an ATSP may be a separate entity from the entity or entities that provide the items being transported and/or interface with the recipients who request delivery of these items. For example, a company that operates a fleet of UAVs configured for item delivery may provide delivery services for third-party entities, such as restaurants, clothing stores, grocery stores, and other "brick and mortar" and/or online retailers, among other possibilities. These third-party entities may have accounts with the UAV transport service provider, via which the third-parties can request and/or purchase UAV transport services from the transport service provider. Further, the third-party entities could interface with recipients (e.g., customers) directly, or through computing systems (e.g., applications and/or server systems) provided by the UAV transport service provider.

Figure 4:
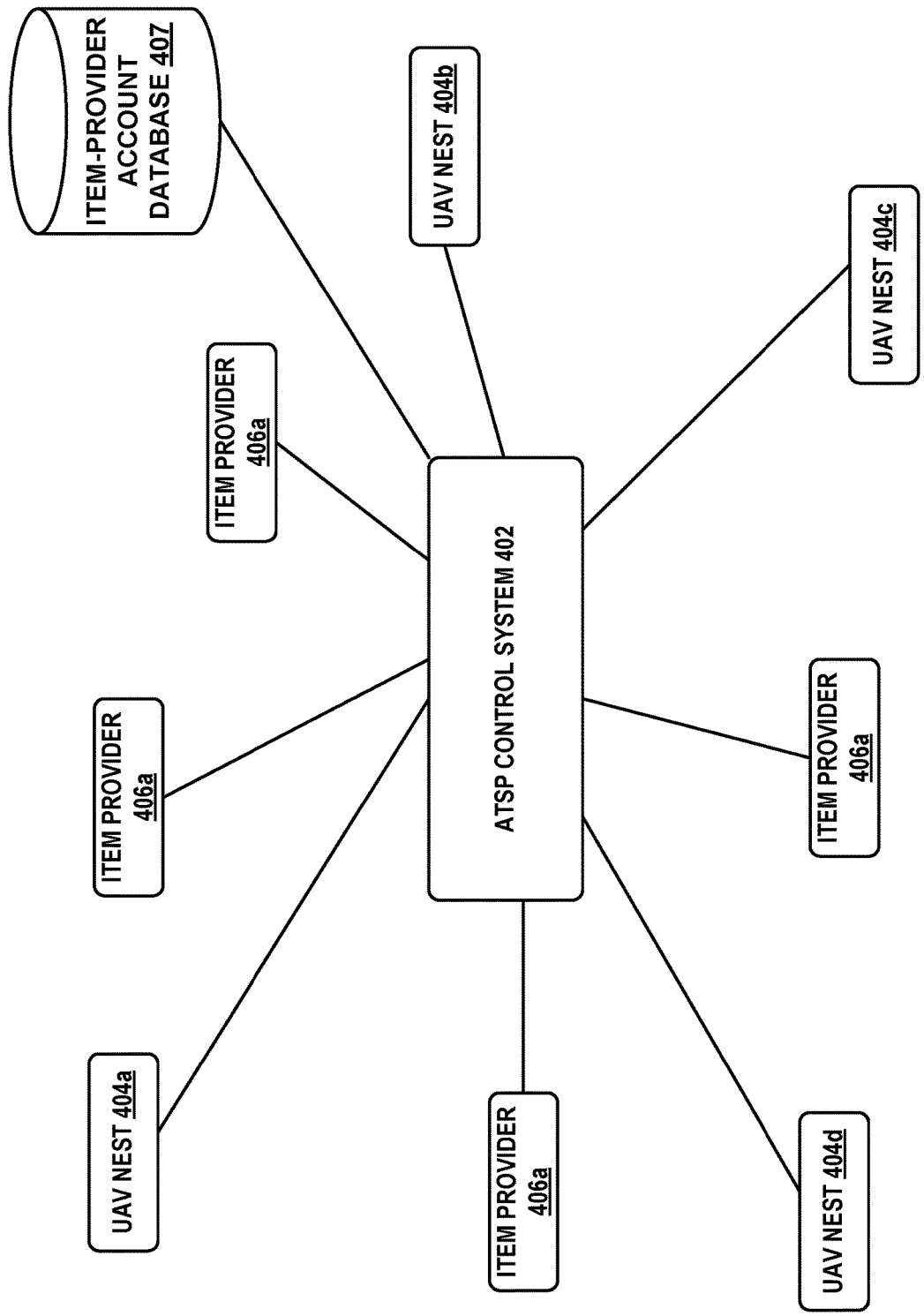
FIG. 4 is a block diagram showing an example arrangement for an aerial transport provider control system, according to example embodiments.

FIG. 4 is a block diagram showing an example arrangement for an aerial transport provider control system 402, which coordinates UAV transport services for a plurality of item providers that are located remotely from the service provider's dispatch locations, and served by a plurality of UAV hubs at various locations. As shown, an aerial transport service provider (ATSP) 402 may be communicatively coupled to UAV nests 404a to 404d, and communicatively coupled to item-provider computing systems 406a to 406d. Such communicative couplings may be implemented using various types of wired and/or wireless communication protocols and networks.

Each UAV nest 404a to 404d is a facility where UAVs can be stored for at least a short period of time, and from which UAVs can begin carrying out a UAV transport task (e.g., where UAVs can take off). In some implementations, some or all of UAV nests 404a to 404d may take the form of a local dispatch system and one or more deployment systems, such as those described in reference to FIG. 3 above. Of course, some or all UAV nests 404a to 404d could also take other forms and/or perform different functions.

Each item-provider computing system 406a to 406d may be associated with a different item-provider account. As such, a given item-provider computing system 406a to 406d may include one or more computing devices that are authorized to access the corresponding item-provider account with ATSP 402. Further, ATSP 402 may store data for item-provider accounts in an item-provider account database 407.

In practice, a given item-provider computing system 406a to 406d may include one or more remote computing devices (e.g., such as one or more remote devices 306 described in reference to FIG. 3), which have logged in to or otherwise been authorized to access the same item-provider account (e.g., cell phones, laptops, and/or computing devices of a business's employees). Additionally or alternatively, an item-provider computing system 406a to 406d may be implemented with less of an ad-hoc approach; e.g., with one or more dedicated user-interface terminals installed at the item provider's facilities. Other types of item-provider computing systems are also possible.

In order to provide UAV transport services to various item providers in an efficient and flexible manner, a UAV transport service provider 402 may dynamically assign different UAVs to transport tasks for different item providers based on demand and/or other factors, rather than permanently assigning each UAV to a particular item provider. As such, the particular UAV or UAVs that carry out transport tasks for a given third-party item provider may vary over time.

The dynamic assignment of UAVs to flights for a number of different item providers can help a UAV transport service provider to more efficiently utilize a group of UAVs (e.g., by reducing unnecessary UAV downtime), as compared to an arrangement where specific UAVs are permanently assigned to specific item providers. More specifically, to dynamically assign UAVs to transport requests from third-party item providers, the UAV transport service provider 402 can dynamically redistribute UAVs amongst a number of UAV deployment locations (which may be referred to as, e.g., "hubs" or "nests") through a service area, according to time-varying levels of demand at various locations or sub-areas within the service area.

With such an arrangement, a delivery flight may involve the additional flight leg to fly from the UAV hub to the item-provider's location to pick up the item or items for transport, before flying to the delivery location, as compared to an arrangement where delivery UAVs are stationed at the source location for items (such as a distributor or retailer warehouse or a restaurant). While the flight leg between the UAV hub and a pick-up location has associated costs, these costs can be offset by more efficient use of each UAV (e.g., more flights, and less unnecessary ground time, in a given period of time), which in turn can allow for a lesser number of UAVs to be utilized for a given number of transport tasks.

V. Methods for Delivery-Location Charging of UAVs

As noted, some example embodiments utilize a recipient-assisted recharging processes to recharge UAVs in the midst of performing an item-transport task. In particular, when a UAV arrives at a delivery location, a UAV may signal that the UAV is ready and/or needs a recipient-assisted recharging process to be carried out to recharge the UAV's battery. Further, the UAV may wait until the battery is recharged to a certain level and/or until other conditions are detected, before taking of for the next flight leg of the item transport task (e.g., before returning to a UAV hub or flying to a subsequent delivery location).

A. Recharging During Partial-Return Delivery

In some implementations, recipient-assisted recharging may be implemented during a transport task for a partial-return delivery. In such cases, the UAV may transport a payload having a returnable and a non-returnable portion. As such, when the UAV arrives at a delivery location where the recipient removes the payload, the UAV may wait for the returnable portion of the payload to be returned before taking off. Further, while waiting for the returnable portion to be returned, the UAV may utilize a recipient-assisted recharging process to charge its battery.

As a specific example, consider the scenario where a recipient orders food to be delivered by a UAV, and the UAV transports the food in a recyclable and/or re-usable container from which the food can also be consumed by the recipient. When the UAV arrives with the food in such a container, the UAV may signal to the recipient to take the payload (e.g., the container with the food therein), and perhaps the UAV itself, inside, and plug the UAV in order to recharge it. The recipient may then eat their food while the UAV is recharging. When the recipient is finished eating and/or when the UAV indicates its battery has been recharged to an acceptable level, the recipient may place the food container back inside the UAV or otherwise secure the food container to the UAV. When the UAV determines that the food container is secured thereto and its battery level is acceptable, the UAV may take off for its next flight leg, taking the food container with it (e.g., for recycling or re-use). Other examples are of course possible.

Figure 5:
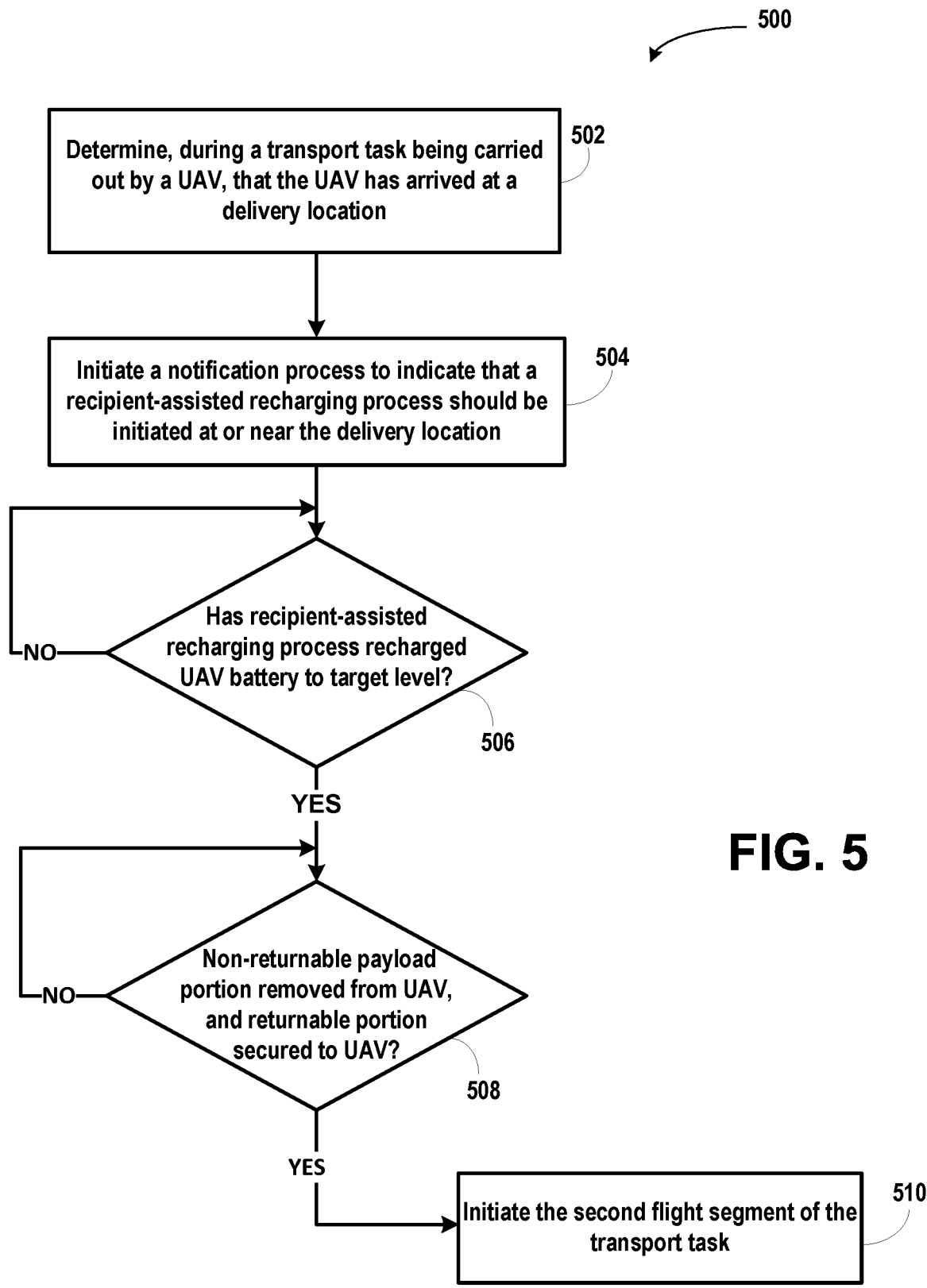
FIG. 5 is a flow chart illustrating a method according to example embodiments.

FIG. 5 is a flow chart illustrating a method 500 according to example embodiments. For ease of explanation, method 500 is described by way of example as being carried out by a UAV. It should be understood actions described as being performed by a UAV could be performed by an on-board computing system of the UAV and/or by other components of the UAV. Further, method 500 or portions thereof can be implemented by other systems and devices, such as a remote control computing system for a UAV, in addition or in the alternative to being implemented by a UAV.

As shown by block 502, method 500 involves determining, during a transport task being carried out by a UAV, that the UAV has arrived at a delivery location. In example embodiments, the transport task carried out at block 502 involves: (a) a first flight segment from an item source location to a delivery location, (b) delivery of at least a portion of a payload at the delivery location, and (c) a second flight segment from the delivery location to a next location.

When the UAV determines it has arrived at the delivery location, the UAV initiates a notification process to indicate that a recipient-assisted recharging process should be initiated at or near the delivery location, as shown by block 504. The UAV may then monitor or periodically check its battery charge level and compare it to a desired charge level and/or other criteria. As such, the UAV can subsequently determine that the recipient-assisted recharging process has recharged a battery of the UAV to a target level, as shown by block 506. When the battery is recharged to the target level, the UAV responsively detects when (i) a non-returnable portion of the payload has been removed from the UAV, and (ii) a returnable portion of the payload is coupled to or otherwise secured to or within the UAV, as shown by block 508. When the non-returnable portion has been removed and the returnable portion of the payload is secured to or within the UAV, the UAV responsively initiates the second flight segment of the transport task, as shown by block 510.

i. Determining that UAV is at the Delivery Location

Generally, the delivery location may be any location specified for the UAV to stop or hover over during a transport task, or any waypoint at the end of a flight leg, which is not the final location where the transport task ends (e.g., a UAV charging hub or nest), such that an item or items can be transferred to a recipient by the UAV and/or left at the delivery location by the UAV.

At block 502, various techniques may be used by a UAV and/or other computing systems to determine when a UAV has arrived at a delivery location. For instance, the UAV may determine it has arrived at a delivery location using a Global Positioning System (GPS), telemetry systems, WiFi or cellular-based triangulation, and/or other locating techniques. Further, the UAV may determine it has arrived based on the UAV's location matching a specific delivery location (e.g., specific GPS coordinates), or an area associated with the delivery location (e.g., an area within a certain distance from GPS coordinates, or an area defined by two or more GPS coordinates. In a further aspect, the determination that a UAV has arrived at a delivery location may be based on a two-dimensional location (e.g., GPS coordinates), or a three-dimensional location taking altitude into account (e.g., GPS coordinates and the altitude of the UAV).

Additionally, it should be understood that block 502 or portions thereof could be performed by a remote computing system, instead of by the UAV. For example, a UAV could periodically or from time to time report its location to a remote computing system, which could then compare the UAV's location to a delivery location specified by the transport task assigned to the UAV, to detect when the UAV has arrived. Other techniques for detecting when the UAV has arrived at the delivery location are also possible.

ii. Initiating the Notification Process for Recipient-Assisted Recharging

At block 504, the notification process may take on various forms. For example, the UAV could simply play out an audible notification (e.g., a pre-recorded voice message or a simple notification sound or sounds), via speakers on the UAV, payload, delivered items, and/or item packaging. Additionally or alternatively, the UAV may play out a visual notification using a light or lights, and/or a graphic display, on the UAV, payload, delivered items, and/or item packaging, for example.

In some embodiments, block 504 could additionally or alternatively involve the UAV initiating a process to notify the recipient via an application on the recipient's computing device (e.g., the recipient's mobile phone, tablet, wearable computing device, laptop, or desktop computer). For example, the UAV could notify a remote computing system (e.g., operated by the ATSP) that it has arrived, which in turn causes the remote computing system to communicate a notification directly or indirectly to an application running on the recipient's computing device. The recipient's computing device may then notify of the recipient that the recipient should, e.g., plug the UAV into a charger, or place the UAV on or next to a wireless charger.

In a further aspect, the UAV could initiate the notification process using a direct connection between an onboard computing system and the recipient's computing device. For example, the UAV could establish a wireless connection with the recipient's mobile phone using WiFi, NFC, or Bluetooth, among other possibilities. The UAV could then send a message indicating that an application running on the mobile phone should notify the recipient to take action to connect or couple the UAV to a charging system at the delivery location.

In some embodiments, the notification process could further involve the UAV and/or a remote system in communication with the UAV providing updated information and/or subsequent notifications to the recipient's computing device (or to a recipient account that can be accessed from the recipient's computing device(s)). For instance, as the UAV charges, the UAV may send updates indicating the UAV battery's level (e.g., as a percentage of a full charge), the increase in battery level from the time recipient-assisted recharging began (e.g., as a percentage increase), and/or an amount of time remaining to reach a target charge level or a full charge, among other possibilities. Provided with such information, an application running on the recipient's device could provide updated charge information (perhaps in real-time) and/or update the recipient with notifications, during the recipient-assisted recharging process.

Additionally or alternatively, updates and/or notifications could be provided on the recipient's device at pre-determined times or milestones during the recipient-assisted recharging process. For example, the UAV could monitor or periodically calculate an estimated remaining time until the UAV's battery reaches a target state-of-charge (SOC) or is fully charged, and send updated information and/or initiate notifications via the recipient's computing device at certain predetermined points. As a specific example, the UAV could send a message indicating when five minutes remain in the recipient-assisted recharging process (or two minutes, or one minute, etc.), such that the recipient can take any actions necessary. For instance, a two-minute notification could indicate that in two minutes from the notification time, the recipient will need to move the UAV to a location where it can take off for the next flight leg in a transport task. Other examples of such notifications are also possible.

iii. Recipient-Assisted Recharging Processes

In a further aspect, various types of recipient-assisted recharging processes are possible, which utilize various types of charging systems. For instance, the recipient-assisted recharging process could involve the recipient plugging the UAV into or otherwise coupling the UAV to a wired charging system, which may be connected to a power source at the delivery location (e.g., at the recipient's home or office). This could involve the recipient moving the UAV to a location where the recipient can plug it in, or simply connecting a charging cable to the UAV at the location where the UAV lands (without moving the UAV).

The recipient-assisted recharging process could also involve the recipient placing the UAV on a wireless charging pad, or other coupling the UAV to a wireless charging system (e.g., and inductive charging system). This could involve the recipient moving and/or positioning the UAV on or within range of a wireless charging system. Alternatively, the recipient could simply bringing a wireless charging system to the UAV at the location where it landed, and positioning the wireless charging system so as to charge the UAV's battery (which may or may not require that the recipient move the UAV).

To facilitate such a recipient-assisted recharging process, an ATSP may provide wired and/or wireless charging systems to recipients, so that they can be used by recipients to recharge UAVs at the delivery location. Such charging systems may be portable and/or may be configured for permanent installation. Further, such charging systems may be configured for various installation locations, either indoors or outdoors.

In some embodiments, the recipient-assisted recharging process could involve the recipient swapping out batteries on the UAV. For instance, the ATSP could provide the recipient with one or more UAV batteries in advance of UAV delivery to the recipient. These batteries could be pre-charged, or could be charged by the recipient before a subsequent UAV delivery. Upon a subsequent item delivery by a UAV, the recipient could remove the UAV's battery, and replace it with a different battery that is fully charged (or charged to some predetermined level).

Further, the recipient could keep the removed battery and connect it to a wired or wireless charger at the delivery location (e.g., in the recipient's home or office). After charging the removed battery, the recipient can use it to repeat the swapping process when the next UAV delivery to the recipient occurs. As such, the UAV can start the next flight leg in the transport task with a fully charged battery. More generally, the ability to swap batteries at delivery locations could allow UAVs to extend their delivery range and/or improve their ability to carry out multi-delivery transport tasks (e.g., by delivering items to multiple delivery locations).

In some embodiments, a battery for a UAV could be located within or otherwise coupled to the payload of the UAV (e.g., within or coupled to payload 228 shown in FIG. 2), instead of being located within or coupled to the body of the UAV itself. In such embodiments, recipient-assisted recharging could involve: (a) the payload being removed from the UAV such that the battery can be coupled to a wired or wireless charger, and then returned when charging reaches a certain level, (b) the payload being moved while coupled to the UAV, but without moving the UAV (e.g., by letting out a tether coupling the payload to the UAV), such that the battery can be coupled to a wired or wireless charger, or (c) the payload and the UAV being moved together, such that the battery can be coupled to a wired or wireless charger, among other possibilities.

iv. Target Level for Recipient-Assisted Recharging

A UAV may implement blocks 506 and 508 in order to determine, or as part of a larger process of determining, when to leave a delivery location to begin the next flight leg in a transport task (e.g., back to a UAV nest or a second delivery location).

More specifically, to implement block 506, once a UAV is connected to a charging system at the delivery location, the UAV can continuously or periodically compare its battery level to a target level. In some cases, the target level may be a full charge (e.g., 100%). In other cases, the target level may be some predetermined percentage of a full charge (e.g., 80%).

Further, the UAV and/or a remote system, could determine the target level for recipient-assisted recharging at various times before or during the performance of a transport task by a UAV. For instance, a UAV and/or an ATSP system (e.g., one or more of the components shown in FIG. 3) could determine the target level for recipient-assisted recharging at a delivery location at some point in advance of a scheduled time for a UAV transport task, or immediately before a UAV transport task begins (e.g., before a UAV begins the first flight leg in the task). Additionally or alternatively, a UAV and/or an ATSP system could determine the target level for recipient-assisted recharging, and/or update a previously determined target level, while the UAV is carrying out a transport task (e.g., at some point after the UAV has taken off for the first flight leg in the task).

As an example, an ATSP system (and/or a UAV) could estimate an expected amount of battery power (e.g., in mAh) that will be needed for the UAV to complete the portion of a transport task following item delivery (e.g., between delivering item(s) at the delivery location and landing at a subsequent final location specified by the task). The ATSP system (and/or the UAV) may then use the expected amount of battery power for the post-delivery portion of the transport task as a basis for determining the target level for recipient-assisted recharging at the delivery location. In some embodiments, there may be a "cushion" added to the estimated power needs as a precaution. The foregoing process could be implemented by the ATSP system and/or UAV before a transport task begins, and/or during the transport task (e.g., when the UAV arrives or is about to arrive at the delivery location).

In another aspect, a UAV (and/or an ATSP system) could estimate the battery level that is expected for a UAV upon arrival at a delivery location. Again, this estimation could be made by the ATSP system and/or UAV before a transport task begins, and/or during the transport task (e.g., when the UAV arrives or is about to arrive at the delivery location). The ATSP system (and/or the UAV) may then use the estimate of the UAV's remaining battery power upon arrival at the delivery location, as a basis for determining the target level for recipient-assisted recharging at the delivery location.

In another aspect, when determining a target level for recipient-assisted recharging during a given transport task, a UAV (and/or an ATSP system) could additionally or alternatively take battery-power requirements or expectations for subsequent transport tasks into account. For instance, an ATSP system could also determine battery-power requirements or expectations for subsequent transport tasks that are currently assigned to the given UAV, or are expected to be assigned to the UAV. The ATSP might also evaluate whether recipient-assisted recharging is expected to be available at during subsequent transport task(s), when determining battery-power requirements or expectations for subsequent transport task(s). Accordingly, when setting the target level for recipient-assisted recharging during a given task assigned to the UAV, an ATSP system can take into account the battery-power requirements and/or expectations for subsequent tasks. As a specific example, the ATSP may set a higher target level for recipient-assisted recharging during a given transport task, when the UAV is assigned subsequent tasks that require more flight time and/or where recipient-assisted recharging is unavailable, and vice versa. Other examples are of course possible.

It should be understood that an ATSP system (and/or a UAV) could use other information to determine the target level for recipient-assisted recharging at the delivery location, in addition or in the alternative to the foregoing examples. Further, note that in the above example, and in other cases, the target level may be determined on a task-by-task basis (e.g., for each individual UAV delivery) based on the state of the UAV carrying out the transport task and/or characteristics of the transport task itself. Of course, it is also possible that the target level could be determined concurrently for groups of tasks, set to a certain values for specific types of UAV deliveries, or perhaps even set fleet-wide. Further, it is possible that the target level could change over time; e.g., based on time-variable demand for UAV transport services in a given area and/or other time-variable factors.

v. Partial-Return Delivery Completion

At block 508, various techniques may be used to determine when the returnable portion of the payload (e.g., a food container) is secured for flight, while the non-returnable portion (e.g., food or other consumable items) has been removed. For example, a payload housing or container may have a scale, such that changes in payload contents can be detected by detecting weight changes.

Additionally or alternatively, various sensors or combinations of sensors could be used to determine when the returnable portion of the payload is secured for flight, and/or when the non-returnable portion (e.g., food or other consumable items) has been removed by the recipient. For example, an image sensor or sensors could be used to identify returnable items and/or non-returnable items via QR codes on the items, and/or based on other visual codes or characteristics of the items. As another example, returnable items and/or non-returnable items could be identified and located via RFID or NFC tags on the items (and the inability to detect such tags could be interpreted as an indication of item removal). Other examples are also possible.

At block 508, the returnable portion of the payload may be considered secured for flight in various circumstances. For instance, the returnable portion may be considered secured when it is placed in a compartment or bay within the UAV, coupled directly or indirectly to a tether (which in turn is coupled to the UAV), or otherwise coupled or secured to the UAV for flight.

vi. Initiating the Next Flight Segment in a Transport Task

At block 510, a UAV may take off from a delivery location once the UAV has been recharged to a target level and the returnable portion of the payload (e.g., returnable items or packaging) is separated from the non-returnable portion and secured for flight.

As noted above, example methods can be implemented to take advantage of down time during partial-return UAV transport tasks, which can occur, e.g., while the recipient consumes food from a returnable container or packaging. By implementing block 506 and 508, and conditioning the initiation of the next flight leg at block 510 on both (a) the recipient returning returnable portion of an order (or separating the non-returnable portion of the payload such that only the returnable portion remains in a UAV payload bay), at block 506, and (ii) the battery being recharged to certain level via recipient-assisted recharging, at block 508, an exemplary method may help a UAV make use of down time during partial-return deliveries.

Further, while not shown specifically in FIG. 5, it should be understood that a UAV can implement a time-out procedure in conjunction with blocks 506 and/or 508. For example, the UAV may require that the returnable portion be returned and/or secured for flight, within some predetermined period of time. This time-out period could begin when the UAV lands, or perhaps when the non-returnable and returnable portions are both removed from the UAV by the recipient. Further, the time-out period could be set or adjusted according to the expected time needed for the recipient-assisted recharging process to charge the UAV's battery to the target level (e.g., so the time-out period allows enough time for recipient-assisted recharging to the target level, and perhaps some additional buffer time afterwards). In any such case, if the conditions of block 506 and/or block 508 are not met by the end of the timeout period, the UAV may take off from the delivery location without the returnable portion of payload.

B. Recharging Methods During Optional-Return Delivery

In some implementations, recipient-assisted recharging may be utilized during a transport task for an "optional-return" UAV delivery, where a recipient has the ability to decide, upon delivery, whether or not to keep or return the delivered item or items. In such embodiments, after the UAV arrives at a delivery location and the delivered items are acquired by the recipient, the UAV may receive input data indicating that the recipient wishes to return one or more items that were just delivered. The UAV may then receive these return item(s) (e.g., in the same UAV payload bay, or the same tethered container, which was used to transport the item(s) to the delivery location), and may transport the item(s) back to their source location (e.g., a third-party item provider), an ATSP-operated UAV nest, or another designated return location.

The UAV transport task for an optional-return delivery may specify a pre-determined "try-out" time period. The UAV may begin the try-out period upon arrival at the delivery location, when the recipient physically removes their items from the UAV, or at another designated start time. If there is no indication that the recipient wishes to return an item at the end of the try-out period, and/or if return items are not provided to the UAV by the recipient within the try-out period, the UAV may take off without any return items to continue with the next flight leg in the transport task.

Accordingly, a UAV can implement example methods in an effort to initiate a recipient-assisted recharging process during the try-out period in an optional-return delivery. Since a UAV may be required to wait at the delivery location during the try-out period or a portion thereof, use of example methods to charge a UAV during this period can help improve a UAV's efficiency over the course of multiple transport tasks (e.g., by reducing the down time for charging in between transport tasks).

As a specific example, consider the scenario where a recipient orders clothing to be delivered by a UAV, and the UAV transports the clothing to the delivery location. When the UAV arrives with the clothing item(s), the UAV may signal to the recipient when it is safe to remove the clothing, and also may indicate to the recipient that they should take action to initiate a recipient-assisted recharging process. The recipient may connect the UAV to a charger at the recipient's location, and proceed to try on the clothing (e.g., to make sure it fits them and/or they like the way the clothing looks when worn.) After the recipient has tried on the delivered clothing, the UAV may provide an input interface via which the recipient can provide input indicating whether they would like to return some or all of the delivered clothing. The UAV may also monitor its battery level during this time. When the UAV determines that (a) its battery has been recharged acceptably, and (b) any items being returned have been re-secured for flight, the UAV may take off for its next flight leg, taking the returned clothing with it.

In another example, example methods could be used to provide a tool rental service. For example, consider the scenario where a recipient rents a tool (e.g., a drill, saw, multimeter), which will be delivered by a UAV. In this scenario, the recipient may only need the tool for a short time to accomplish a certain task (e.g., a specialized saw needed only for one or two cuts). When the UAV arrives with the tool(s) and/or other rental item(s), the UAV may signal to the recipient when it is safe to remove the the tool(s) and/or other rental item(s), and also may indicate to the recipient that they should take action to initiate a recipient-assisted recharging process. The recipient may connect the UAV to a charger at the recipient's location, and proceed to use the rental tools (e.g., the recipient could use a specialized saw to make a few cuts.) After the recipient has finished using the rental item(s) (e.g., finished making the few specialized cuts with a rental saw), the recipient may return the rental item(s) to the UAV. The UAV may also monitor its battery level during this time. When the UAV determines that (a) its battery has been recharged acceptably, and (b) the rental items have been returned and have been re-secured for flight, the UAV may take off for its next flight leg (e.g., to return the rented item(s) to the rental company).

Figure 6:
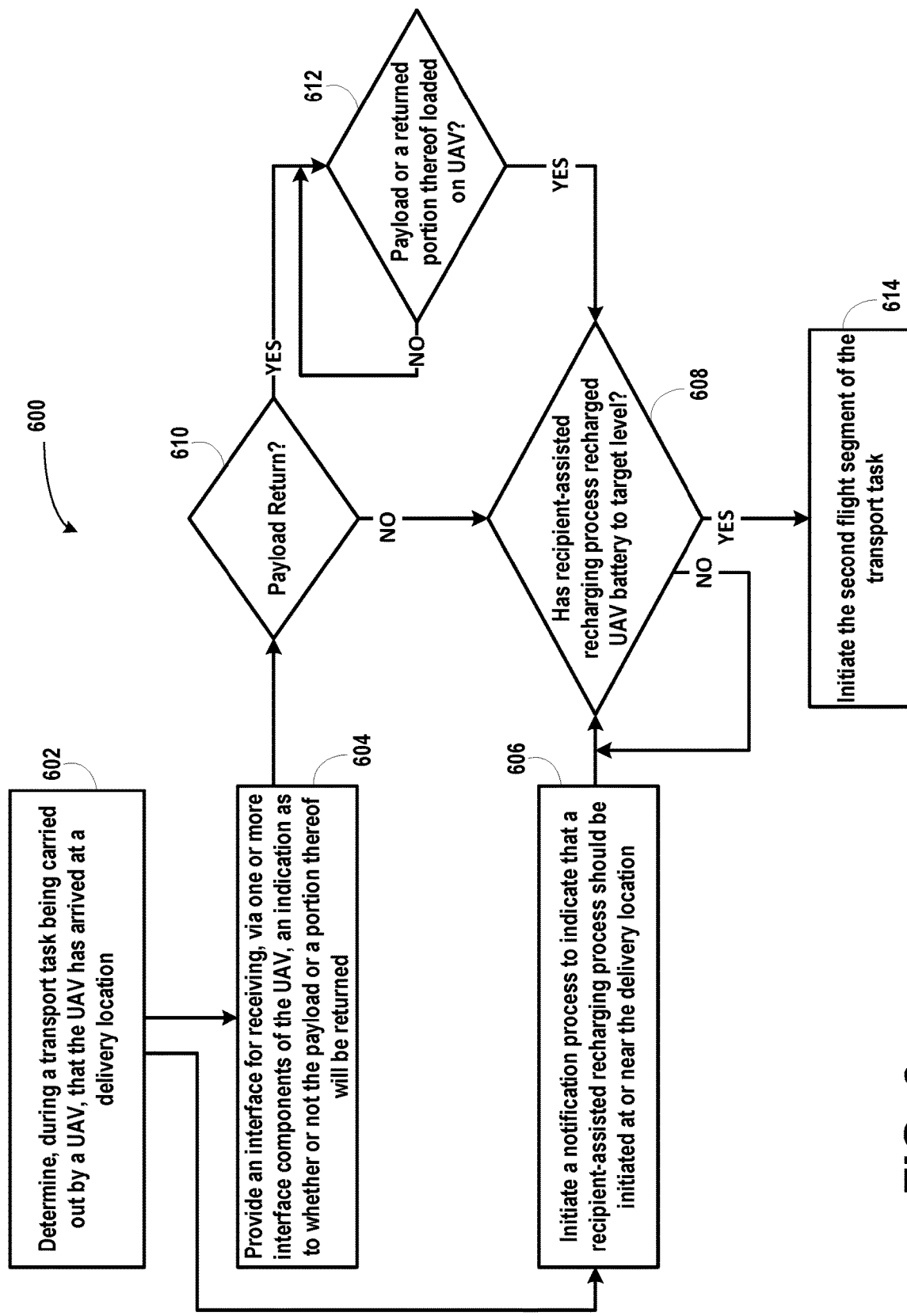
FIG. 6 is a flow chart illustrating another method according to example embodiments.

More generally, FIG. 6 is a flow chart illustrating a method 600 according to example embodiments. For ease of explanation, method 600 is described by way of example as being carried out by a UAV. It should be understood actions described as being performed by a UAV could be performed by an on-board computing system of the UAV and/or by other components of the UAV. Further, method 600 or portions thereof can be implemented by other systems and devices, such as a remote control computing system for a UAV, in addition or in the alternative to being implemented by a UAV.

As shown by block 602, method 600 involves a UAV determining, during a transport task being carried out by the UAV, that the UAV has arrived at a delivery location. In the illustrated example, the transport task includes at least a first flight segment from a loading location to a delivery location for delivery of a payload, and a second flight segment from the delivery location to a next location. Block 602 may be carried out using the same or similar techniques as those described in reference to block 502 of method 500.

Continuing with method 600, in response to determining that it has landed at the delivery location, the UAV provides an interface for receiving, via one or more interface components of the UAV, an indication as to whether or not the payload or a portion thereof will be returned, as shown by block 604. The UAV also initiates a notification process to indicate that a recipient-assisted recharging process should be initiated, as shown by block 606.

Then, at block 608, the UAV determines whether the recipient-assisted recharging process has recharged a battery of the UAV to a target level. Block 608 may be carried out using the same or similar techniques as those described in reference to block 506 of method 500. The UAV also waits for an indication in input data as to whether or not the payload (or a portion thereof) will be returned, as shown by block 610.

When an indication is received that at least a portion of the payload will be returned, the UAV can wait for at least some period for the portion of the payload to be returned to the UAV, before initiating the next flight segment in the transport task. At block 612, when the UAV determines that the payload or a returned portion thereof is loaded on or in the UAV, the UAV responsively initiates the next flight segment in the transport task, as shown by block 614. On the other hand, when an indication is received that the payload will not be returned, the UAV simply waits for the recipient-assisted recharging process to recharge the battery to the target level, and then initiates the second flight segment at block 614.

At block 604, various types of interfaces may be provided via which a recipient can indicate whether or not they want to return an item via the same UAV that just delivered it (and if so, which items). For example, the UAV could notify a remote computing system (e.g., operated by the ATSP) that it has arrived, which in turn causes the remote computing system to communicate directly or indirectly to an application running on the recipient's computing device (e.g., the recipient's mobile phone, tablet, wearable computing device, laptop, or desktop computer).

As such, the recipient may be prompted, via such an application, to indicate whether they would like to return any item that was just delivered, and perhaps be provided with an interface to designate specific items from the delivery for immediate return. Such an application may notify the recipient that such input is requested via visual prompts or notifications, audible prompts or notification, and/or tactile prompts or notification (e.g., vibration). Further, the input data indicating the recipient's intentions may take on various forms, and may be provided via various types of user interface devices, such as graphic displays, touchscreens, touch pads, keyboards, microphones, image sensors, motion sensors, and so on.

In another aspect, the notification process at block 606 may be implemented in the same or similar way as described above in reference to block 504 of method 500. Furthermore, in embodiments where an interface to specify return items is provided via an application on the recipient's computing device (e.g., at block 604), the same application may be utilized for the notification process (e.g., at block 606) and/or other functionality of such applications described herein.

In a further aspect, block 610 may be implemented using similar techniques as those described above in reference to block 508 of method 500. In particular, the UAV may use various sensors (e.g., imaging sensors, scales, RFID readers, etc.) to detect when items not designated for return have been removed, while the items designated for return have been returned and secured to the UAV for flight (e.g., within its payload).

Further, those skilled in the art will understand that block 614 of method 600 may be implemented using the same or similar techniques as those described in reference to block 510 of method 500. Additionally, method 600 could involve a time-out procedure (not shown), which is similar to the time-out procedure described above in reference to blocks 506 and 508 of method 500. Specifically, a time-out procedure could be implemented in conjunction with method 600, such that the UAV will take off after some predetermined period of time, in the event that the recipient does not provide any input as to whether or not they wish to return any item(s), and/or in the event the recipient provides input indicating they want to return an item, but fails to return the item within some predetermined period of time.

VI. CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   determining that an unmanned aerial vehicle (UAV) has arrived at a delivery location while carrying out a transport task, wherein the transport task comprises at least a first flight segment to transport a payload from a loading location to a delivery location, delivery of the payload at the delivery location, and a second flight segment from the delivery location to a next location, wherein the UAV comprises a winch system comprising a tether disposed on a spool and a motor operable to apply a torque to the spool, wherein a battery of the UAV forms part of the payload, and wherein the payload is coupled to the tether;
   based on determining that the UAV has arrived at the delivery location, (i) causing the motor to rotate the spool to unwind the tether and (ii) initiating a notification process requesting a recipient-assisted recharging process comprising a manual coupling of the battery to a power source at or near the delivery location after the tether has been unwound and while the battery remains coupled to the UAV by way of the tether;
   determining that the recipient-assisted recharging process has recharged the battery of the UAV to a target level; and
   based on determining that the recipient-assisted recharging process has recharged the battery of the UAV to the target level, (i) causing the motor to rotate the spool to retract the tether and the battery back to the UAV and (ii) initiating the second flight segment for the transport task.

2. The method of claim 1, further comprising:
   determining when a non-returnable portion of the payload has been removed from, and a returnable portion of the payload is coupled to or held by, the UAV, wherein the second flight segment is initiated further based on determining that the non-returnable portion is removed and the returnable portion is secured.

3. The method of claim 2, wherein the non-returnable portion of the payload comprises an item, and wherein returnable portion of the payload comprises packaging or a container for the item.

4. The method of claim 3, wherein the packaging or container is formed from one or more recyclable materials, and wherein the transport task further comprises one or more flight segments to transport the packaging or container to a recycling location.

5. The method of claim 1, wherein the next location comprises a carrier-operated location or a source location for item transport.

6. The method of claim 2, wherein the transport task is a multi-delivery task, wherein the payload comprises a first payload and a second payload, wherein the first payload comprises the returnable and non-returnable portions, and wherein the second payload comprises a second returnable portion and a second non-returnable portion, and wherein the next location is a second delivery location corresponding to the second payload.

7. The method of claim 6, further comprising, after delivering the second non-returnable portion of the second payload at the second delivery location, initiating a third flight segment from the second delivery location to a third location.

8. The method of claim 2, wherein the non-returnable portion of the payload comprises at least one food item, and wherein returnable portion of the payload comprises at least one re-usable utensil, dishware, or tableware item.

9. The method of claim 1, further comprising:
based on determining that the recipient-assisted recharging process has recharged the battery of the UAV to the target level, initiating an additional notification process comprising requests for (i) a manually-assisted decoupling of the battery from the power source and (ii) a recipient-assisted placement of the UAV at a location from which the UAV can initiate the second flight segment.

10. The method of claim 1, wherein the notification process comprises transmitting, to a computing device associated with a recipient of the payload, a request for the recipient to take action to couple the battery of the UAV to the power source after delivery of the payload to the recipient.

11. The method of claim 1, wherein the notification process comprises a request for the manual coupling of the battery to the power source without moving the UAV.

12. The method of claim 1, wherein the notification process comprises a request for a recipient of the payload to (i) move the battery from a landing location of the UAV and (ii) plug an electrical interface of the battery into a standardized AC power source at or near the delivery location.

13. The method of claim 1, further comprising:
determining the target level to which to recharge a battery of the UAV based on expected availability of recipient-assisted recharging during one or more subsequent transport tasks.

14. A method comprising:
determining that an unmanned aerial vehicle (UAV) has arrived at a delivery location while carrying out a transport task, wherein the transport task comprises at least a first flight segment from a loading location to the delivery location for delivery of a payload, and a second flight segment from the delivery location to a next location, wherein the UAV comprises a winch system comprising a tether disposed on a spool and a motor operable to apply a torque to the spool, wherein a battery of the UAV forms part of the payload, and wherein the payload is coupled to the tether;
in response to determining that the UAV has landed at the delivery location:
providing an interface for receiving an indication as to whether or not a return payload will be loaded at the delivery location;
causing the motor to rotate the spool to unwind the tether; and
initiating a notification process requesting a recipient-assisted recharging process comprising a manual coupling of the battery to a power source at or near the delivery location after the tether has been unwound and while the battery remains coupled to the UAV by way of the tether;
determining that the recipient-assisted recharging process has recharged the battery of the UAV to a target level;
when an indication is received that no return payload will be loaded at the delivery location and the recipient-assisted recharging process has recharged the battery to the target level: (i) causing the motor to rotate the spool to retract the tether and the battery back to the UAV and (ii) initiating the second flight segment; and
when an indication is received that the return payload will be loaded at the delivery location and the recipient-assisted recharging process has recharged the battery to the target level: (i) causing the motor to rotate the spool to retract the tether and the battery back to the UAV, and (ii) determining when the return payload is loaded on or in the UAV, and responsively initiating the second flight segment.

15. The method of claim 14, wherein the payload comprises one or more items of clothing, and wherein the notification process indicates that the recipient-assisted recharging process should be initiated so the UAV can charge while a recipient of the payload tries on the one or more items of clothing.

16. The method of claim 15, wherein the one or more items of clothing comprise a plurality of items, the method further comprising:
receiving an indication that a first of the plurality of items will be returned, but no indication that a second of the plurality of items will be returned.

17. The method of claim 14, further comprising:
when the indication is received that the return payload will be loaded at the delivery location and the recipient-assisted recharging process has recharged the battery to the target level: (i) causing the motor to rotate the spool to retract the tether and the battery back to the UAV and (ii) determining that (a) a predetermined period of time has elapsed since arriving at the delivery location or since the indication that the return payload will be loaded, and (b) the return payload has not been loaded, and responsively initiating the second flight segment without the return payload.

18. The method of claim 14, wherein the return payload comprises at least one of: (i) one or more items from the payload or (ii) one or more items that were not part of the payload and that were delivered during a previous transport task.

19. A system comprising:
a processor; and
a non-transitory computer-readable storage medium having stored thereon instructions that, when executed by the processor, cause the processor to perform operations comprising:

determining that an unmanned aerial vehicle (UAV) has arrived at a delivery location while carrying out a transport task, wherein the transport task comprises at least a first flight segment to transport a payload from a loading location to a delivery location, delivery of the payload at the delivery location, and a second flight segment from the delivery location to a next location, wherein the UAV comprises a winch system comprising a tether disposed on a spool and a motor operable to apply a torque to the spool, wherein a battery of the UAV forms part of the payload, and wherein the payload is coupled to the tether;

based on determining that the UAV has arrived at the delivery location, (i) causing the motor to rotate the spool to unwind the tether and (ii) initiating a notification process requesting a recipient-assisted recharging process comprising a manual coupling of the battery to a power source at or near the delivery location after the tether has been unwound and while the battery remains coupled to the UAV by way of the tether;

determining that the recipient-assisted recharging process has recharged the battery of the UAV to a target level; and based on determining that the recipient-assisted recharging process has recharged the battery of the UAV to the target level, (i) causing the motor to rotate the spool to retract the tether and the battery back to the UAV and (ii) initiating the second flight segment for the transport task.

20. The system of claim 19, wherein the notification process comprises a request for the manual coupling of the battery to the power source without moving the UAV.

\* \* \* \* \*